United States Patent
Chiche et al.

(10) Patent No.: US 9,736,623 B2
(45) Date of Patent: Aug. 15, 2017

(54) SYSTEM FOR EXCHANGING DATA REMOTELY WITH AN NFC RADIO TAG

(71) Applicant: SCHNEIDER ELECTRIC INDUSTRIES SAS, Rueil-Malmaison (FR)

(72) Inventors: Thierry Chiche, Grenoble (FR); Romain Gassion, Grenoble (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 14/650,691

(22) PCT Filed: Nov. 25, 2013

(86) PCT No.: PCT/FR2013/052842
§ 371 (c)(1),
(2) Date: Jun. 9, 2015

(87) PCT Pub. No.: WO2014/091106
PCT Pub. Date: Jun. 19, 2014

(65) Prior Publication Data
US 2016/0192116 A1 Jun. 30, 2016

(30) Foreign Application Priority Data
Dec. 14, 2012 (FR) .................................... 12 62080

(51) Int. Cl.
*H04B 5/00* (2006.01)
*H04W 4/00* (2009.01)
*H04B 5/02* (2006.01)

(52) U.S. Cl.
CPC .......... *H04W 4/008* (2013.01); *H04B 5/0062* (2013.01); *H04B 5/02* (2013.01)

(58) Field of Classification Search
CPC .. H04B 5/0031; H04B 5/0037; H04B 5/0062; H04B 5/02; H04W 4/008
See application file for complete search history.

(56) References Cited

U.S. PATENT DOCUMENTS

| | | | |
|---|---|---|---|
| 5,142,397 A * | 8/1992 | Dockery ................ | G08C 23/04 341/176 |
| 6,895,252 B2 * | 5/2005 | Pugel ..................... | G08C 17/02 340/12.3 |

(Continued)

FOREIGN PATENT DOCUMENTS

| WO | 2009 039419 | 3/2009 |
|---|---|---|
| WO | 2009 044228 | 4/2009 |

OTHER PUBLICATIONS

International Search Report Issued Feb. 12, 2014 in PCT/FR13/052842 filed Nov. 25, 2013.

*Primary Examiner* — Nguyen Vo
(74) *Attorney, Agent, or Firm* — Oblon, McClelland, Maier & Neustadt, L.L.P.

(57) ABSTRACT

A system for exchanging data, remotely, between a reading station and a radio tag, the system including: a first assembly including a reading interface configured to read data stored in the radio tag and a first communication mechanism for transmitting a signal representative of the data read in the radio tag; a second assembly including a second communication mechanism connected to the first communication mechanism and configured to receive the signal, and an offset radio tag, including a memory configured to store data representative of the received signal.

8 Claims, 1 Drawing Sheet

(56) References Cited

U.S. PATENT DOCUMENTS

| | | | |
|---|---|---|---|
| 6,972,661 B2* | 12/2005 | Wang | G08C 17/02 340/425.1 |
| 2008/0252426 A1* | 10/2008 | Lee | G06K 7/0008 340/10.3 |
| 2009/0085738 A1* | 4/2009 | Darianian | G01S 5/14 340/539.11 |
| 2009/0143104 A1 | 6/2009 | Loh et al. | |
| 2010/0123559 A1* | 5/2010 | Wilkinson | G06K 7/0008 340/10.4 |
| 2010/0167643 A1 | 7/2010 | Hirsch | |
| 2011/0210830 A1 | 9/2011 | Talty et al. | |
| 2012/0322375 A1 | 12/2012 | Hirsch | |
| 2013/0092741 A1 | 4/2013 | Loh et al. | |
| 2013/0122803 A1* | 5/2013 | Forster | H04B 7/155 455/11.1 |
| 2013/0231048 A1 | 9/2013 | Hirsch | |

* cited by examiner

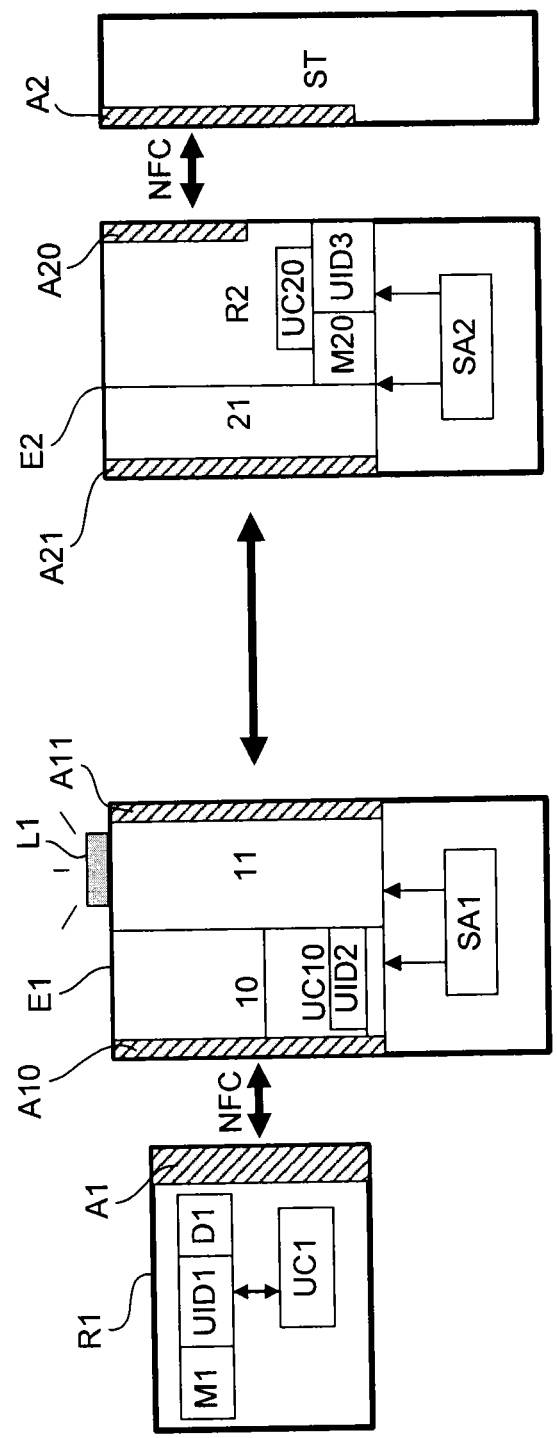

SYSTEM FOR EXCHANGING DATA REMOTELY WITH AN NFC RADIO TAG

TECHNICAL FIELD OF THE INVENTION

The present invention pertains to a system for exchanging data remotely with a radio tag, preferably of NFC type.

PRIOR ART

Radio tags, comprising a memory, a microprocessor and an antenna, are increasingly widespread. They are usually passive, that is to say they do not comprise any source for powering their internal circuits. Their antenna enables them to pick up the electromagnetic signals emitted by a reading/writing station placed within range (less than 10 centimeters away) and transforms these signals into electrical energy by inductive technology. The reading/writing station powers said radio tag and communicates with it by modulating the electromagnetic signal. It can thus write data to the memory of the radio tag and read the data stored in said memory. These radio tags operate according to a technology termed near field (NFC for "Near Field Communication").

As written hereinabove, to be able to read data in the radio tag or write data thereto, the station must be positioned in proximity to the radio tag, that is to say a distance of less than 10 centimeters away. However, it may happen that the radio tag is placed in a very inaccessible location or one which it is not desired to access whenever a communication is to be established. This will be the case for example for a radio tag placed inside an electrical cabinet kept closed.

The aim of the invention is therefore to propose a system making it possible to exchange data with a radio tag of the type described hereinabove, remotely, that is to say with a bigger range than that normally envisaged for this kind of radio tag.

DISCLOSURE OF THE INVENTION

This aim is achieved by a system for exchanging data, remotely, between a reading station and a radio tag, said system comprising:
- a first assembly comprising a reading interface designed to read data stored in the radio tag and first communication means for emitting a signal representative of said data read in the radio tag,
- a second assembly comprising second communication means linked to the first communication means and designed to receive said signal, and a, so-called offset, radio tag comprising a memory designed to store data representative of the signal received.

According to a particular feature, the first communication means and the second communication means are linked by a wireless link.

According to another particular feature, the wireless link operates according to a communication protocol of ZIGBEE, ZIGBEE Green Power or BLUETOOTH type.

According to another particular feature, the first assembly is powered by a power supply source chosen from among a cell, a battery or an electrical distribution network.

According to another particular feature, the second assembly is designed to be powered by inductive technology by the reading station and/or by a power supply source chosen from among a cell, a battery or an electrical distribution network.

According to another particular feature, the first assembly comprises a visualization unit activated when a communication is established between the first assembly and the second assembly.

According to another particular feature, the first assembly comprises a housing accommodating the reading interface and the first communication means.

According to another particular feature, the second assembly comprises a housing, distinct from the housing of the first assembly, accommodating the second communication means and the offset radio tag.

BRIEF DESCRIPTION OF THE FIGURES

Other characteristics and advantages will become apparent in the detailed description which follows, given in conjunction with FIG. 1 which represents the system of the invention making it possible to exchange data remotely with a radio tag.

DETAILED DESCRIPTION OF AT LEAST ONE EMBODIMENT

The invention relates to a system for exchanging data remotely with a radio tag, preferably of NFC type.

In the present description it must be understood that the exchanging of data consists of the reading of data stored in the radio tag and in the writing of data in the radio tag. Therefore, "reading station" and "reading interface" of a radio tag must be understood to imply that this station and this interface are also capable of writing data in a radio tag.

A reading station may for example be embedded in a mobile terminal, such as for example a mobile telephone or a tablet.

A radio tag is well known and communicates for example according to a near-field technology (NFC for "Near Field Communication"). Such a radio tag comprises a memory M1 making it possible to store a unique identifier UID1 and data D1, a microprocessor UC1 making it possible in particular to read the data contained in the memory M1 and to write data thereto and an antenna A1 making it possible to communicate with an external reading station. The radio tag is preferably passive, that is to say it does not comprise any internal source for powering its electronic circuits. Its antenna picks up an electromagnetic signal emitted by an antenna of the reading station positioned within range and, by inductive technology, converts it into electrical energy to be utilized by its internal circuits.

With reference to FIG. 1, the system of the invention is intended to allow the remote exchange of data between a, so-called main, radio tag R1 such as described hereinabove and a reading station ST. The main radio tag R1 is for example positioned in a location that is difficult to access or in a location that is kept closed. It is for example attached to a device and is intended to store data relating to this device.

The system of the invention thus comprises a first assembly E1 composed of a reading interface 10 and of first communication means 11. This first assembly is powered by a power supply source SA1, composed for example of a cell, of a battery or of an electrical distribution network. The first assembly E1 is positioned in proximity to the main radio tag R1, that is to say within range of the latter, in such a way that the reading interface 10 can exchange data with the main radio tag R1. The reading interface 10 comprises an antenna A10 making it possible to couple itself magnetically with the antenna A1 of the main radio tag R1 so as to power it and to communicate with it and a microcontroller UC10 storing a unique identifier UID2 and allowing it to control the reading of the data stored in the main radio tag R1 or the writing of data in the main radio tag R1.

The reading interface 10 is connected to the first communication means 11 and its microcontroller UC10 is designed to control the dispatching of one or more signals by way of said first communication means 11. The first communication means 11 can communicate by wired or wireless link. Preferably, these communication means communicate by wireless link and are able to exchange data according to a determined communication protocol, for example ZIGBEE, ZIGBEE Green Power or BLUETOOTH.

The first assembly E1 comprises for example a housing enclosing the reading interface 10 and the first communication means 11, this housing being intended to be fixed within range of the main radio tag R1, a sufficient distance away such that the reading interface 10 is in magnetic coupling with the main radio tag R1.

The system of the invention comprises a second assembly E2 comprising second communication means 21 and a, so-called offset, radio tag R2 connected to the second communication means 21. The offset radio tag R2, like the main radio tag R1, comprises a microprocessor UC20 for controlling the second communication means 21, a memory M20 for storing a unique identifier UID3 and data representative of the signals received by the second communication means 21 and an antenna A20 for communicating with the reading station ST. The offset radio tag R2 is designed to be able to control the second communication means 21 so as to be able to exchange data with the reading interface 10 located in the first assembly E1.

The second communication means 21 are designed to communicate with the first communication means 11 by wired link, for example via a serial or Ethernet protocol, or through a wireless link, via the communication protocol adopted, for example ZIGBEE, ZIGBEE Green Power or BLUETOOTH.

The second assembly E2 comprises a housing enclosing the offset radio tag R2 and the second communication means 21. This housing is positioned so as to establish a communication with the first assembly E1, via the wired or wireless link.

The system is intended to be positioned between the main radio tag R1 and the reading station ST. The reading station ST is placed within range of the offset radio tag R2 so as to be able to power it and to exchange data with it. The reading interface 10 is for its part positioned within range of the main radio tag R1 so as to be able to read data D1 therefrom and/or write the latter thereto.

The reading station ST is associated with a man-machine interface making it possible to control the reading of the data stored in the offset radio tag R2 and the writing of data in this offset radio tag R2. This reading station ST is for example embedded in a mobile terminal such as described hereinabove.

The offset radio tag R2 is self-powered by electrical energy generated by inductive technology when the reading station ST is brought near. This electrical energy is preferably employed to power the second communication means 21 too. However, if its quantity is insufficient, then the second communication means 21 and/or the offset radio tag R2 can be powered, partially or entirely, with another power supply source SA2, for example a cell, a battery or the electrical network.

According to the invention, the offset radio tag R2 is associated, beforehand, with the main radio tag R1 so as to exchange data only with the main radio tag R1. The link between the reading station ST and the main radio tag R1 is made secure by relying on the NFC capabilities of the two assemblies. The communication will be made secure by generating a unique token based on the unique identifiers of the main radio tag R1, of the reading interface 10 and of the offset radio tag R2.

The system of the invention operates in the following manner:

Pairing/configuration phase:

The first step consists in pairing the main radio tag R1 attached to a device with the reading interface 10 of the first assembly. Accordingly:

the operator positions the reading interface 10 in pairing mode so as to store in its memory information on the device, for example its description, a photo, its geographical position.

By bringing the reading interface 10 near to the main radio tag R1, the reading interface 10 also recovers the unique identifier UID1 of the main radio tag R1.

The second step consists in pairing the first assembly with the second assembly. Accordingly:

The operator brings the first assembly E1 near to the second assembly E2 so that the reading interface 10 and the offset radio tag R2 exchange their respective unique identifier and that the reading interface 10 also transmits the unique identifier UID1 of the main radio tag R1 to the offset radio tag R2. The three unique identifiers UID1, UID2 and UID3 constitute the pairing token used for any communication between the first assembly E1 and the second assembly E2.

The offset radio tag R2 can also recover the device description information.

Once the pairing has been concluded, the communication between the main radio tag R1 and the reading station ST begins with an initialization phase, described hereinbelow:

The operator brings the reading station ST near to the offset radio tag R2, making it possible to power, by induction via the NFC, the electronic circuits of the offset radio tag R2 and to activate the second communication means 21.

By bringing the reading station ST near to the offset radio tag R2, the communication between the second communication means 21 and the first communication means 11 is established, allowing an exchange of the unique identifiers UID1, UID2, UID3 for verification.

In case of non-correspondence between the unique identifiers, the communication between the reading station ST and the main radio tag R1 will not be possible. In case of validation, the main radio tag R1 will permit the exchange of data with the reading station ST.

After validation of the communication, the device description information is for example dispatched to the reading station ST, for example for display via a dedicated application executed on the station. As a variant embodiment, this information can be displayed directly on a screen associated with the offset radio tag R2 or on a screen present on the reading interface 10. According to the invention, a visualization unit, for example a light-emitting diode L1, is for example positioned on the first assembly E1 so as to signal the establishment of the communication.

Once the communication has been established, from the main radio tag R1 to the reading station ST, the exchange of data can be carried out according to two distinct embodiments.

In the first embodiment, the data stored in the main radio tag R1 are reproduced fully in the offset radio tag R2. The offset radio tag R2 is therefore the perfect image of the main radio tag R1. The reading interface 10 periodically reads the data stored in the main radio tag R1 and are dispatched according to the same period to the second assembly E2 so as to be written in the memory of the offset radio tag R2. Thus, when the operator brings the reading station ST near to the offset radio tag R2, it is as if he were bringing his station ST near to the main radio tag R1. The principle is the same when writing data in the main radio tag R1. The data are written in the offset radio tag R2 and are periodically transferred to the main radio tag R1.

In the second embodiment, the exchanges of data take place at the request of the reading station ST. The data written in the offset radio tag R2 are those requested of the main radio tag R1 by the reading station ST. In this second embodiment, the reading station ST writes a request to read or write in the offset radio tag R2, said request is transferred to the reading interface 10, which then executes the request in the main radio tag R1. In the case of the reading of data, the information read is returned to the offset radio tag R2 so that it can be transmitted to the reading station ST.

According to the invention, one and the same first assembly could be dedicated to several radio tags. In this configuration, the reading interface 10 comprises for example a correspondence table allowing it to associate each radio tag with a distinct offset radio tag.

The system of the invention therefore presents numerous advantages listed hereinbelow:
  possibility of exchanging data with a radio tag, even if the latter is situated in a location with restricted or difficult access,
  quasi-autonomous solution in terms of energy, active solely when the reading station is brought near,
  compatibility with known wired or wireless communication protocols,
  security of reading by virtue of the pairing carried out between the radio tag and the offset radio tag,
  ease of installation,
  compactness, since it requires only two assemblies,
  possibility of preserving a standard reading station, such as that already present in mobile terminals.

The invention claimed is:

1. A system for exchanging data, remotely, between a reading station and a radio tag, the system comprising:
  a first assembly comprising
    a first near field communication interface configured to read data stored in the radio tag and
    a first link communication interface for emitting a signal representative of the data read in the radio tag, and
    a first housing configured to accommodate the first near field communication interface and the first link communication interface; and
  a second assembly, configured to be remotely located from the first assembly, comprising
    a second link communication interface configured to receive the emitted signal from the first link communication interface,
    a remote radio tag including a memory configured to store data representative of the signal received,
    a second near field communication interface configured to transmit the stored data in the remote radio tag to the reading station, and
    a second housing configured to accommodate the second link communication interface, the remote radio tag, and the second near field communication interface,
  wherein a process of the second near field communication interface transmitting the stored data to the reading station is initiated by the reading station being brought within a proximity of the remote radio tag of the second assembly.

2. The system as claimed in claim 1, wherein the first link communication interface and the second link communication interface are configured to communicate with each other over a wireless link.

3. The system as claimed in claim 2, wherein the wireless link operates according to a communication protocol of ZIGBEE, ZIGBEE Green Power, or BLUETOOTH type.

4. The system as claimed in claim 1, wherein the first assembly is powered by a power supply source chosen from among a cell, a battery, or an electrical distribution network.

5. The system as claimed in claim 1, wherein the second assembly is configured to be powered by inductive technology by the reading station and/or by a power supply source chosen from among a cell, a battery, or an electrical distribution network.

6. The system as claimed in claim 1, wherein the first assembly comprises a visualization unit activated when a communication is established between the first assembly and the second assembly.

7. The system as claimed in claim 1, wherein the second assembly is configured to periodically receive the data stored in the radio tag to be written in the memory of the remote radio tag prior to the reading station being brought within the proximity of the remote radio tag of the second assembly to initiate the process.

8. The system as claimed in claim 1, wherein the second assembly is configured to receive the data stored in the radio tag to be written in the memory of the remote radio tag after the reading station is brought within the proximity of the remote radio tag of the second assembly to initiate the process.

* * * * *